United States Patent
Huang et al.

(10) Patent No.: US 12,257,907 B1
(45) Date of Patent: Mar. 25, 2025

(54) SYSTEM AND METHOD FOR DETECTING ROTARY TRANSFORMER PERFORMANCE BASED ON DATA ANALYSIS

(71) Applicant: Changzhou Huaxuan Sensing Technology Co., Ltd, Jiangsu (CN)

(72) Inventors: Yan Huang, Jiangsu (CN); Weifeng Ma, Jiangsu (CN)

(73) Assignee: Changzhou Huaxuan Sensing Technology Co., Ltd, Jiangsu (CN)

( * ) Notice: Subject to any disclaimer, the term of this patent is extended or adjusted under 35 U.S.C. 154(b) by 0 days.

(21) Appl. No.: 18/824,261

(22) Filed: Sep. 4, 2024

(30) Foreign Application Priority Data

Sep. 12, 2023 (CN) .......................... 202311168200.3

(51) Int. Cl.
  *B60L 3/00* (2019.01)
  *G07C 5/00* (2006.01)
  *G07C 5/08* (2006.01)

(52) U.S. Cl.
  CPC ............ *B60L 3/0061* (2013.01); *G07C 5/008* (2013.01); *G07C 5/0808* (2013.01); *G07C 5/0816* (2013.01); *B60L 2250/00* (2013.01)

(58) Field of Classification Search
  CPC ... B60L 3/0061; B60L 2250/00; G07C 5/008; G07C 5/0808; G07C 5/0816
  See application file for complete search history.

(56) References Cited

U.S. PATENT DOCUMENTS

| | | | |
|---|---|---|---|
| 3,792,342 A | * | 2/1974 | Ogawa .................. G01K 13/08 324/706 |
| 7,103,460 B1 | | 9/2006 | Breed |

FOREIGN PATENT DOCUMENTS

| | | |
|---|---|---|
| CN | 114646464 A | 6/2022 |
| CN | 114186338 A | 3/2023 |
| CN | 116608896 A | 8/2023 |
| JP | 2010234518 A | 10/2010 |

OTHER PUBLICATIONS

Zhang, Xiaoxing. "Static Detection and Analysis of Pure Electric Vehicle Driving Motor"; Automobile Applied Technology; Year: 2021; No. 12; pp. 1-3 and p. 10.
Zhang, Weipeng. "Research on High-Precision Decoding Algorithm of Resolver and System Implementation"; North University of China; Jun. 5, 2020; pp. 1-87.

* cited by examiner

*Primary Examiner* — Michael V Kerrigan
(74) *Attorney, Agent, or Firm* — NKL Law; Allen Xue

(57) ABSTRACT

A system and method for detecting rotary transformer performance based on data analysis includes a related user vehicle analysis module, which obtains the status characteristics of the rotary transformer during each maintenance of the vehicle under test. It constructs a relationship function of winding variables with vehicle operation time and analyzes the deviation between the constructed relationship function and the corresponding functions in the database for vehicles that have undergone rotary transformer replacement, thereby obtaining a set of related user vehicles for the vehicle under test. The system and method takes into account the vehicle user's usage of the vehicle and the impact of temperature and vibration on the rotary transformer during vehicle operation. It analyzes the impact of the vehicle user's usage on the performance of the rotary transformer, thereby accurately predicting the remaining service life of the rotary transformer and providing timely fault warnings to the vehicle user.

5 Claims, 2 Drawing Sheets

SYSTEM AND METHOD FOR DETECTING ROTARY TRANSFORMER PERFORMANCE BASED ON DATA ANALYSIS

TECHNICAL FIELD

The present invention relates to the technical field of rotary transformer performance detection, specifically a system and method for detecting rotary transformer performance based on data analysis.

BACKGROUND ART

With the proliferation of new energy vehicles, the drive motor, as a crucial component, has gained significant attention. Among its key parts, the rotary transformer is a sensor that measures the motor's speed and position. It operates by inducing a rotating magnetic field and generating corresponding electrical signals, enabling motor monitoring and control. A malfunction in the rotary transformer can lead to the drive motor's failure to start, rendering the new energy vehicle inoperative. Thus, analyzing and detecting the performance of rotary transformers has become an urgent issue.

Existing rotary transformer performance detection systems based on data analysis typically determine performance by comparing the resistance values of the winding coils in the rotary transformer with allowable resistance ranges. However, these systems do not consider the vehicle usage by the user and the impact of temperature and vibration on the rotary transformer during vehicle operation (since the main component of the rotary transformer is a coil, its temperature rises during operation. When subjected to external vibrations, the internal wiring of the coil may deform more easily, increasing resistance and potentially causing an open circuit). Consequently, these systems cannot accurately predict the remaining service life of the rotary transformer, revealing significant shortcomings in current technology.

SUMMARY OF THE INVENTION

The purpose of the present invention is to provide a system and method for detecting rotary transformer performance based on data analysis, addressing the issues mentioned in the background.

To resolve the above technical problems, the present invention offers the following technical solution: A method for detecting rotary transformer performance based on data analysis, comprising the following steps:

S1: Obtain vehicle usage information during the period between two consecutive maintenance events from historical data for the vehicle under test. Generate interference characteristics of the rotary transformer based on this usage information, which includes the number of vehicle operations, the temperature values of the rotary transformer at different times during each operation, and the vibration state values.

S2: Obtain the status characteristics of the rotary transformer during each maintenance of the vehicle under test. These characteristics include the resistance values of the excitation winding, sine winding, and cosine winding. Construct a relationship function reflecting the change in winding variables with vehicle operation time, where the winding variables are defined as the maximum differences between the resistance values of the excitation winding, sine winding, and cosine winding, and their respective initial resistance values. Analyze the deviation between the constructed relationship function and the corresponding functions in the database for vehicles that have undergone rotary transformer replacement, thereby obtaining a set of related user vehicles.

S3: Combine the interference characteristics of the rotary transformer based on the vehicle usage information and the fluctuation range of resistance values corresponding to each winding, to obtain the bump open-circuit risk resistance variation for the vehicle under test. Substitute this variation into the relationship function of winding variables with operation time for each related user vehicle, and record the average value of the results for each operation time as the effective operational lifespan of the rotary transformer.

S4: Calculate the fault risk impact value of the rotary transformer at the current time based on its total usage time and effective operational lifespan from historical data. If the fault risk impact value is below the risk threshold, generate a pre-warning message for rotary transformer replacement and send this message to the user's mobile terminal via a wireless communication network.

Further, the temperature values of the rotary transformer at different times in the vehicle usage information are obtained from the temperature sensor closest to the rotary transformer.

The vibration state values of the rotary transformer at different times in the vehicle usage information are equal to the monitoring results of the vibration sensor closest to the rotary transformer at the corresponding time.

The method for generating interference characteristics of the rotary transformer based on the vehicle usage information in S1 includes the following steps:

S11: Obtain vehicle usage information during the period between the i-th and (i+1)-th maintenance events from historical data for the vehicle under test, denoted as $A_{(i,i+1)}$. Record the time interval of the j-th operation in $A_{(i,i+1)}$ as $Bj_{(i,i+1)}$, and record the temperature value of the rotary transformer at time t in $Bj_{(i,i+1)}$ as $Ttj_{(i,i+1)}$, and the vibration state value at time t in $Bj_{(i,i+1)}$ as $Ztj_{(i,i+1)}$, where $t \in Bj_{(i,i+1)}$.

S12: During the j-th operation of the vehicle under test between the i-th and (i+1)-th maintenance periods, obtain the interference impact value on the rotary transformer caused by the operating environment, denoted as $Gj_{(i,i+1)}$.

$$Gj_{(i,i+1)} = \int_{t=t1}^{t=t2} F\{Ttj_{(i,i+1)}, Tb\} \times Ztj_{(i,i+1)} dt,$$

where t1 represents the minimum value in $Bj_{(i,i+1)}$, t2 represents the maximum value in $Bj_{(i,i+1)}$, and Tb is a preset temperature reference value in the database.

When $Ttj_{(i,i+1)} \geq Tb$, then $F\{Ttj_{(i,i+1)}, Tb\} = g \times (Ttj_{(i,i+1)} - Tb) + r$, When $Ttj_{(i,i+1)} < Tb$, then $F\{Ttj_{(i,i+1)}, Tb\} = g1 \times (Tb - Ttj_{(i,i+1)}) + r$, Here, g represents the first interference conversion coefficient, g1 represents the second interference conversion coefficient, and r represents the temperature interference threshold, with g, g1, and r being preset constants in the database.

S13: Enter each interference impact value on the rotary transformer caused by the operating environment, obtained from the historical data with different values of i and j, into an empty set to form an interference impact set. The element with the maximum interference impact value in the set is considered the interference characteristic of the rotary transformer based on the vehicle usage information for the vehicle under test.

The invention considers the differences in interference impact values generated during each vehicle operation. Although each interference impact value varies, they all reflect, to some extent, the effect on the rotary transformer performance due to the vehicle's usage. The obtained interference characteristics provide data support for the subsequent step of determining the bump open-circuit risk resistance variation.

Further, the method for constructing the relationship function of winding variables with vehicle operation time in S2 includes the following steps:

S201: Obtain the status characteristics of the rotary transformer during each maintenance of the vehicle under test, and record the resistance values of the excitation winding, sine winding, and cosine winding during the i-th maintenance as $D[i]_1$, $D[i]_2$, and $D[i]_3$, respectively.

S202: Construct the winding variable data pair corresponding to the status characteristics of the rotary transformer during the i-th maintenance of the vehicle under test, denoted as (STi, RBi), where STi represents the operation time of the vehicle from the most recent rotary transformer replacement to the i-th maintenance, and RBi represents the winding variable value corresponding to the status characteristics of the rotary transformer during the i-th maintenance. $RBi=\max\{D[i]_1-DM_1, D[i]_2-DM_2, D[i]_2-DM_2\}$, where max{ } represents the maximum function, and $DM_1$, $DM_2$, $DM_3$ represent the initial resistance values of the excitation winding, sine winding, and cosine winding, respectively, corresponding to the most recent rotary transformer replacement.

S203: Construct a Cartesian coordinate system with the origin at o, vehicle operation time as the x-axis, and winding variable values as the y-axis. Mark the coordinates of the winding variable data pairs obtained in S202 for different values of i on the Cartesian plane. Connect the marked adjacent coordinate points in ascending order of x-axis values to obtain a polyline chart representing the change in winding variable values with vehicle operation time. Use the corresponding function of the polyline chart as the relationship function of winding variables with vehicle operation time, denoted as F(x), where the range of x is [0, xm], with xm representing the total operation time of the vehicle during its most recent maintenance.

The invention considers the resistance values of the windings during maintenance because, during operation, dust gradually accumulates on the rotary transformer, affecting the resistance values of the windings. During each maintenance, technicians clean the dust off the rotary transformer, leading to more accurate monitoring of the winding resistance values, facilitating precise analysis of the relationship function of winding variables with vehicle operation time.

Further, the method for obtaining the set of related user vehicles for the vehicle under test in S2 includes the following steps:

S211: Obtain the relationship function of winding variables with vehicle operation time for user vehicles in the database that have undergone rotary transformer replacement. Denote the relationship function for the k-th user vehicle before the replacement as Fk(xk), where the range of xk is [0,xkm], with xkm representing the total operation time of the k-th user vehicle at the time of replacement. The operation time represents the duration during which the vehicle was in a running state.

S212: Obtain the deviation state value between F(x) and Fk(xk), denoted as $P_{[F(x),Fk(xk)]}$, $$P_{[F(x),Fk(xk)]} = \{\int_{xL=0}^{xL=\min\{xm,xkm\}} |Fk(xL)-F(xL)|dxL\}/\min\{xm,xkm\},$$

where min{ } denotes the operation to find the minimum value, Fk(xL) represents the result of Fk(xk) when xk equals xL, and F(xL) represents the result of F(x) when x equals xL.

S213: If $P_{[F(x),Fk(xk)]} \leq \beta$ and xkm>xm, the user vehicle corresponding to Fk(xk) is classified as a related user vehicle for the vehicle under test. Otherwise, it is not classified as a related user vehicle. β is a preset deviation state threshold in the database.

The set of all related user vehicles for the vehicle under test in the database is referred to as the related user vehicle set for the vehicle under test.

This invention considers that the relationship function between the winding variables and vehicle operation time in the vehicle under test may not exhibit a clear trend (i.e., no obvious regularity). Therefore, the relationship function of winding variables with vehicle operation time for user vehicles whose relationship function is similar to that of the vehicle under test is used to indirectly and accurately predict the relationship between the performance (winding variables) of the rotary transformer in the vehicle under test and vehicle operation time.

Further, the method for obtaining the bump open-circuit risk resistance variation for the vehicle under test in S3 includes the following steps:

S301: Obtain the fluctuation range of resistance values corresponding to each winding of the rotary transformer based on the vehicle usage information and the interference characteristics of the rotary transformer. The fluctuation range corresponds to the normal operating resistance range for each winding of the rotary transformer, as preset in the database.

S302: Obtain the bump open-circuit risk resistance variation, denoted as min{a1, a2}, a1 represents the difference between the maximum value within the resistance fluctuation range of the winding with the greatest difference from its initial resistance value at the current time, corresponding to the excitation winding resistance, sine winding resistance, and cosine winding resistance, and the initial resistance value of the corresponding winding.

a2 represents the open-circuit impact resistance, where a2=b−h×c, with b representing the difference between the maximum winding resistance n, corresponding to the same winding as a1, during the operation of the rotary transformer before replacement, as recorded in historical data, and the initial resistance value of the corresponding winding of the rotary transformer in the vehicle under test. In this invention, it is assumed that a rotary transformer with a short-circuited or open-circuited winding cannot function. h represents the bump interference resistance coefficient, and c represents the interference characteristics of the rotary transformer based on the vehicle usage information for the vehicle under test.

The value of h is equal to the average of the bump interference coefficients corresponding to each historical experimental data pair, where each experimental data pair corresponds to one bump interference coefficient.

Denote any experimental data pair as (Ec, N), where the Ec values differ among different experimental data pairs. Ec represents the interference characteristics of the rotary transformer based on the vehicle usage information in the experimental data pair. Let W denote the winding corresponding to a1 during the operation of the rotary transformer before its replacement in the historical data. N represents the average resistance value of winding type W before being influenced by the interference characteristics Ec in experiments where, after being influenced by Ec, the coil corresponding to winding type W in the vehicle's rotary transformer experienced an open circuit. Additionally, N<n.

The bump interference coefficient corresponding to (Ec, N) is equal to (n−N)/Ec.

In the process of obtaining the open-circuit impact resistance, the invention considers the combined influence of temperature and vibration on the resistance of the winding coil in the rotary transformer. The higher the temperature, the softer the material of the wiring in the winding coil, and under the influence of vibration, the wiring is more prone to deformation (stretching), thereby increasing the resistance of the winding coil. The coefficient h represents the impact of interference characteristics (interference impact value) on winding resistance (bump interference coefficient). Obtaining the bump open-circuit risk resistance variation provides data support for accurately predicting the remaining service life of the rotary transformer in subsequent steps, thereby providing fault warnings.

Furthermore, in S3, during the process of substituting the bump open-circuit risk resistance variation of the vehicle under test into the relationship function of winding variables with vehicle operation time for each related user vehicle in the set, ensure that within the relationship function of winding variables with vehicle operation time for each related user vehicle, the y-axis coordinate value range is greater than or equal to the bump open-circuit risk resistance variation of the vehicle under test.

Further, the method for obtaining the fault risk impact value of the rotary transformer in the vehicle under test at the current time in S4 includes the following steps:

S41: Obtain the total usage time SYT and the effective operation life YYT of the rotary transformer in the vehicle under test from historical data.

S42: Calculate the fault risk impact value of the rotary transformer in the vehicle under test at the current time, denoted as GFY The value of GFY is calculated as GFY=(YYT−SYT)/PYT, where PYT represents the average total operation time of the vehicle between consecutive maintenance events.

A rotary transformer performance detection system based on data analysis, comprising the following modules:

Interference Feature Extraction Module: This module obtains vehicle usage information during the period between two consecutive maintenance events for the vehicle under test from historical data.

It generates interference characteristics of the rotary transformer based on this usage information, which includes the number of vehicle operations, the temperature values of the rotary transformer at different times during each operation, and the vibration state values.

Related User Vehicle Analysis Module: This module obtains the status characteristics of the rotary transformer during each maintenance of the vehicle under test. It constructs the relationship function of winding variables with operation time, analyzes the deviation between the constructed relationship function and the corresponding functions in the database for vehicles that have undergone rotary transformer replacement, and obtains a set of related user vehicles.

Rotary Transformer Lifespan Prediction Module: This module combines the interference characteristics of the rotary transformer based on the vehicle usage information and the fluctuation range of resistance values corresponding to each winding, to obtain the bump open-circuit risk resistance variation for the vehicle under test. It substitutes this variation into the relationship function of winding variables with operation time for each related user vehicle, and records the average value of the results for each operation time as the effective operational lifespan of the rotary transformer.

Fault Risk Warning Module: This module calculates the fault risk impact value of the rotary transformer at the current time based on its total usage time and effective operational lifespan from historical data. If the fault risk impact value is below the risk threshold, it generates a pre-warning message for rotary transformer replacement and sends this message to the user's mobile terminal via a wireless communication network, where the wireless communication network includes any of 4G, 5G, and WiFi.

Further, the related user vehicle analysis module includes a status characteristic extraction unit, a winding variable function analysis unit, and a related user vehicle set generation unit.

The status characteristic extraction unit obtains the status characteristics of the rotary transformer during each maintenance, including the resistance values of the excitation winding, sine winding, and cosine winding.

The winding variable function analysis unit constructs the relationship function of winding variables with operation time, where the winding variables are defined as the maximum differences between the resistance values of the excitation winding, sine winding, and cosine winding, and their respective initial resistance values, with different resistance values for the excitation winding, sine winding, and cosine winding stored in the database.

The related user vehicle set generation unit analyzes the deviation between the constructed relationship function and the corresponding functions in the database for vehicles that have undergone rotary transformer replacement, thereby obtaining the related user vehicle set.

Compared to prior art, the beneficial effects of the present invention are that it considers the vehicle usage by the user and the impact of temperature and vibration on the rotary transformer during vehicle operation. It comprehensively analyzes the impact of the user's vehicle usage on the performance of the rotary transformer, thereby accurately predicting the remaining service life of the rotary transformer, providing timely fault warnings to the vehicle user, reducing the safety risks associated with rotary transformer failure during vehicle operation, ensuring the user's driving safety, and effectively monitoring rotary transformer performance.

DESCRIPTION OF THE DRAWINGS

The accompanying drawings provide further understanding of the present invention and constitute a part of the specification. They are used to explain the invention in conjunction with the embodiments and do not constitute a limitation on the invention. In the drawings.

DETAILED DESCRIPTION OF THE EMBODIMENTS

The technical solutions in the embodiments of the present invention will be clearly and completely described below in conjunction with the drawings in the embodiments of the present invention. It is evident that the described embodiments are only a part of the embodiments of the present invention, not all of them. Based on the embodiments in the present invention, all other embodiments obtained by those skilled in the art without any creative efforts shall fall within the protection scope of the present invention.

Figure 1:
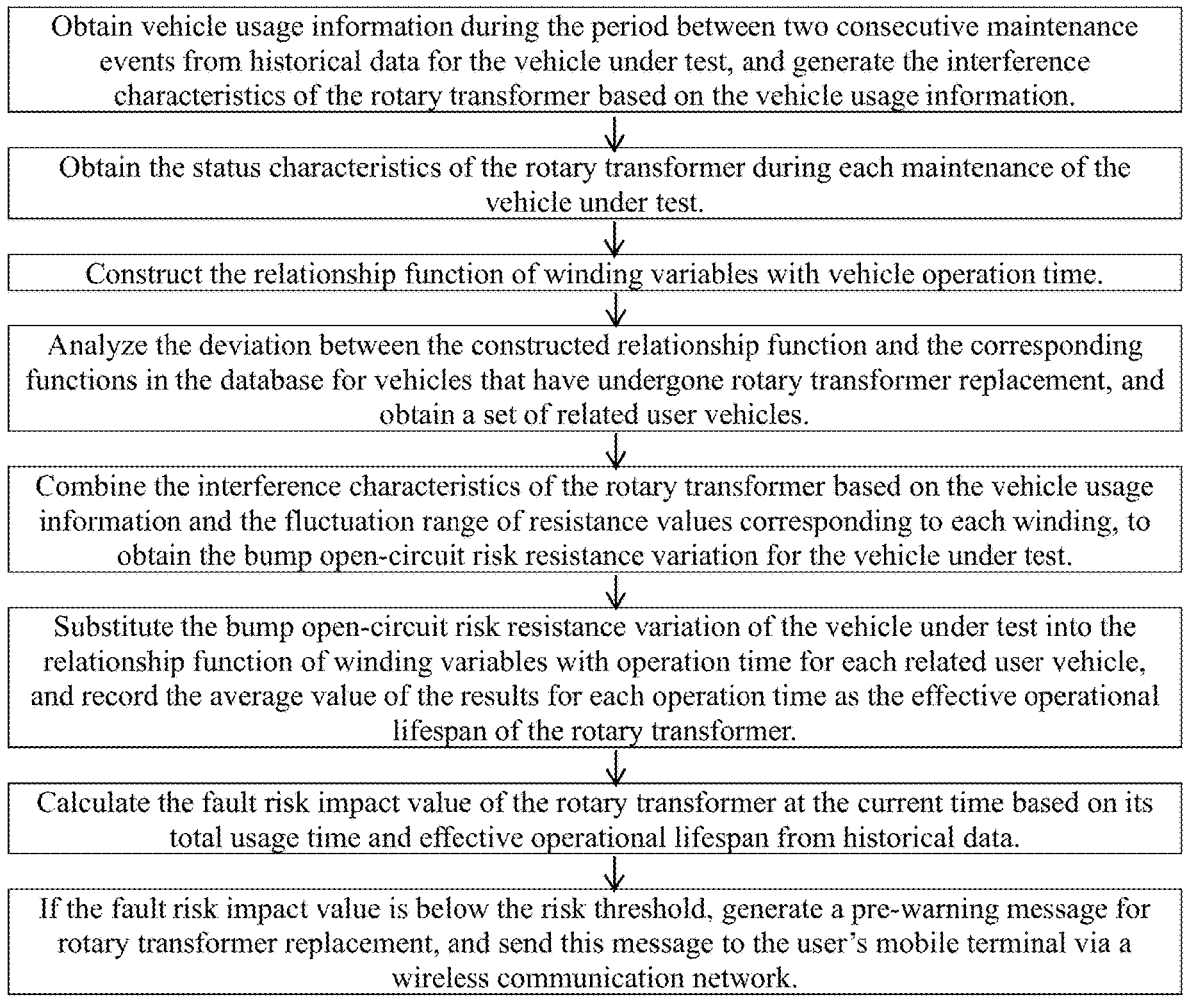
FIG. 1: A structural diagram of the rotary transformer performance detection system based on data analysis according to the present invention.

Referring to FIG. 1, the present invention provides a technical solution: A method for detecting rotary transformer performance based on data analysis, comprising the following steps:

S1: Obtain vehicle usage information during the period between two consecutive maintenance events for the vehicle under test from historical data. Generate interference characteristics of the rotary transformer based on this usage information, which includes the number of vehicle operations, the temperature values of the rotary transformer at different times during each operation, and the vibration state values.

The temperature values of the rotary transformer at different times in the vehicle usage information are obtained from the temperature sensor closest to the rotary transformer.

The vibration state values of the rotary transformer at different times in the vehicle usage information are equal to the monitoring results of the vibration sensor closest to the rotary transformer at the corresponding time.

The method for generating interference characteristics of the rotary transformer based on the vehicle usage information in S1 includes the following steps:

S11: Obtain vehicle usage information during the period between the i-th and (i+1)-th maintenance events from historical data for the vehicle under test, denoted as $A_{(i,i+1)}$. Record the time interval of the j-th operation in $A_{(i,i+1)}$ as $Bj_{(i,i+1)}$, and record the temperature value of the rotary transformer at time t in $Bj_{(i,i+1)}$ as $Ttj_{(i,i+1)}$, and the vibration state value at time t in $Bj_{(i,i+1)}$ as $Ztj_{(i,i+1)}$, where $t \in Bj_{(i,i+1)}$.

S12: During the j-th operation of the vehicle under test between the i-th and (i+1)-th maintenance periods, obtain the interference impact value on the rotary transformer caused by the operating environment, denoted as $Gj_{(i,i+1)}$.

$$Gj_{(i,i+1)} = \int_{t=t1}^{t=t2} F\{Ttj_{(i,i+1)}, Tb\} \times Ztj_{(i,i+1)} dt,$$

where t1 represents the minimum value in $Bj_{(i,i+1)}$, t2 represents the maximum value in $Bj_{(i,i+1)}$, and Tb is a preset temperature reference value in the database.

When $Ttj_{(i,i+1)} \geq Tb$, then $F\{Ttj_{(i,i+1)}, Tb\} = g \times (Ttj_{(i,i+1)} - Tb) + r$, When $Ttj_{(i,i+1)} < Tb$, then $F\{Ttj_{(i,i+1)}, Tb\} = g1 \times (Tb - Ttj_{(i,i+1)}) + r$, Here, g represents the first interference conversion coefficient, g1 represents the second interference conversion coefficient, and r represents the temperature interference threshold, with g, g1 and r being preset constants in the database.

S13: Enter each interference impact value on the rotary transformer caused by the operating environment, obtained from the historical data with different values of i and j, into an empty set to form an interference impact set. The element with the maximum interference impact value in the set is considered the interference characteristic of the rotary transformer based on the vehicle usage information for the vehicle under test.

S2: Obtain the status characteristics of the rotary transformer during each maintenance of the vehicle under test. These characteristics include the resistance values of the excitation winding, sine winding, and cosine winding. Construct a relationship function reflecting the change in winding variables with vehicle operation time, where the winding variables are defined as the maximum differences between the resistance values of the excitation winding, sine winding, and cosine winding, and their respective initial resistance values. Analyze the deviation between the constructed relationship function and the corresponding functions in the database for vehicles that have undergone rotary transformer replacement, thereby obtaining a set of related user vehicles.

The method for constructing the relationship function of winding variables with vehicle operation time in S2 includes the following steps:

S201: Obtain the status characteristics of the rotary transformer during each maintenance of the vehicle under test. Record the resistance values of the excitation winding, sine winding, and cosine winding during the i-th maintenance as $D[i]_1$, $D[i]_2$, and $D[i]_3$, respectively.

S5202: Construct the winding variable data pair corresponding to the status characteristics of the rotary transformer during the i-th maintenance of the vehicle under test, denoted as (STi, RBi). Here, STi represents the operation time of the vehicle from the most recent rotary transformer replacement to the i-th maintenance, and RBi represents the winding variable value corresponding to the status characteristics of the rotary transformer during the i-th maintenance. $RBi = \max\{D[i]_1 - DM_1, D[i]_2 - DM_2, D[i]_2 - DM_2\}$, where max{ } represents the function to obtain the maximum value, and $DM_1$, $DM_2$, and $DM_3$ represent the initial resistance values of the excitation winding, sine winding, and cosine winding, respectively, corresponding to the most recent rotary transformer replacement.

S203: Construct a Cartesian coordinate system with the origin at o, vehicle operation time as the x-axis, and winding variable values as the y-axis. Mark the coordinates of the winding variable data pairs obtained in S202 for different values of i on the Cartesian plane. Connect the marked adjacent coordinate points in ascending order of x-axis values to obtain a polyline chart representing the change in winding variable values with vehicle operation time. Use the corresponding function of the polyline chart as the relationship function of winding variables with vehicle operation time, denoted as F(x), where the range of x is [0, xm], with xm representing the total operation time of the vehicle during its most recent maintenance.

In this embodiment, the reference voltage for the excitation winding of the vehicle's rotary transformer is 3 to 3.5V AC when measured at the plug terminal with the ignition switch in the ON position.

Sine Winding Resistance: When the plug is removed, the resistance at the sensor terminal should be 60Ω±10Ω, meaning the resistance fluctuation range of the sine winding is [50,70]Ω, with the initial resistance value of the sine winding being between 50Ω and 70Ω.

Cosine Winding Resistance: When the plug is removed, the resistance at the sensor terminal should be 60Ω±10Ω, meaning the resistance fluctuation range of the cosine winding is [50,70]Ω, with the initial resistance value of the cosine winding being between 50Ω and 70Ω.

Excitation Winding Resistance: When the plug is removed, the resistance at the sensor terminal should be 30Ω±10Ω, meaning the resistance fluctuation range of the excitation winding is [20,40]Ω, with the initial resistance value of the excitation winding being between 20Ω and 40Ω.

The method for obtaining the set of related user vehicles for the vehicle under test in S2 includes the following steps:

S211: Obtain the relationship function of winding variables with vehicle operation time for user vehicles in the database that have undergone rotary transformer replacement. Denote the relationship function for the k-th user vehicle before the replacement as Fk(xk), where the range of xk is [0,xkm], with xkm representing the total operation time of the k-th user vehicle at the time of replacement. The operation time represents the duration during which the vehicle was in a running state.

S212: Obtain the deviation state value between F(x) and Fk(xk), denoted as $P_{[F(x),Fk(xk)]}$, $$P_{[F(x),Fk(xk)]} = \{\int_{xL=0}^{xL=min\{xm,xkm\}} |Fk(xL)-F(xL)|dxL\}/min\{xm,xkm\},$$

where min{ } represents the operation to find the minimum value. Fk(xL) represents the result when xk equals xL in Fk(xk), and F(xL) represents the result when x equals xL in F(x).

S213: If $P_{[F(x),Fk(xk)]} \leq \beta$ and xkm>xm, then the user vehicle corresponding to Fk(xk) is classified as a related user vehicle for the vehicle under test. Otherwise, it is not classified as a related user vehicle. p is a preset deviation state threshold in the database.

The set of all related user vehicles for the vehicle under test in the database is referred to as the related user vehicle set for the vehicle under test.

S3: Combine the interference characteristics of the rotary transformer based on the vehicle usage information with the fluctuation range of resistance values corresponding to each winding of the rotary transformer to obtain the bump open-circuit risk resistance variation for the vehicle under test. Substitute the bump open-circuit risk resistance variation of the vehicle under test into the relationship function of winding variables with operation time for each related user vehicle in the set. The average value of the results for each operation time is recorded as the effective operational lifespan of the rotary transformer in the vehicle under test.

The method for obtaining the bump open-circuit risk resistance variation for the vehicle under test in S3 includes the following steps:

S301: Obtain the fluctuation range of resistance values corresponding to each winding of the rotary transformer based on the vehicle usage information and the interference characteristics of the rotary transformer. The fluctuation range corresponds to the normal operating resistance range for each winding of the rotary transformer, as preset in the database.

S302: Obtain the bump open-circuit risk resistance variation for the vehicle under test, denoted as min{a1, a2}.

a1 represents the difference between the maximum value within the resistance fluctuation range of the winding with the greatest difference from its initial resistance value at the current time, among the excitation winding resistance, sine winding resistance, and cosine winding resistance, and the initial resistance value of the corresponding winding.

a2 represents the open-circuit impact resistance, where a2=b−h×c, with b representing the difference between the maximum winding resistance n, corresponding to the same winding as a1, during the operation of the rotary transformer before replacement, as recorded in historical data, and the initial resistance value of the corresponding winding of the rotary transformer in the vehicle under test. This invention assumes that a rotary transformer with a short-circuited or open-circuited winding cannot function. h represents the bump interference resistance coefficient, and c represents the interference characteristics of the rotary transformer based on the vehicle usage information for the vehicle under test.

The value of h is equal to the average of the bump interference coefficients corresponding to each historical experimental data pair, where each experimental data pair corresponds to one bump interference coefficient.

Any experimental data pair is denoted as (Ec, N), where the Ec values differ among different experimental data pairs. Ec represents the interference characteristics of the rotary transformer based on the vehicle usage information in the experimental data pair. Let W denote the winding corresponding to a1 during the operation of the rotary transformer before its replacement in the historical data. N represents the average resistance value of winding type W before being influenced by the interference characteristics Ec in experiments where, after being influenced by Ec, the coil corresponding to winding type W in the vehicle's rotary transformer experienced an open circuit. Additionally, N<n.

The bump interference coefficient corresponding to (Ec, N) is equal to (n−N)/Ec.

In S3, during the process of substituting the bump open-circuit risk resistance variation of the vehicle under test into the relationship function of winding variables with operation time for each related user vehicle in the set, ensure that within the relationship function of winding variables with operation time for each related user vehicle, the y-axis coordinate value range is greater than or equal to the bump open-circuit risk resistance variation of the vehicle under test.

S4: Calculate the fault risk impact value of the rotary transformer at the current time based on its total usage time and effective operational lifespan from historical data. If the fault risk impact value is below the risk threshold, generate a pre-warning message for rotary transformer replacement and send this message to the user's mobile terminal via a wireless communication network.

The method for obtaining the fault risk impact value of the rotary transformer in the vehicle under test at the current time in S4 includes the following steps:

S41: Obtain the total usage time SYT and the effective operation life YYT of the rotary transformer in the vehicle under test from historical data.

S42: Calculate the fault risk impact value of the rotary transformer in the vehicle under test at the current time, denoted as GFY GFY is calculated as GFY=(YYT−SYT)/PYT, where PYT represents the average total operation time of the vehicle between consecutive maintenance events.

Figure 2:
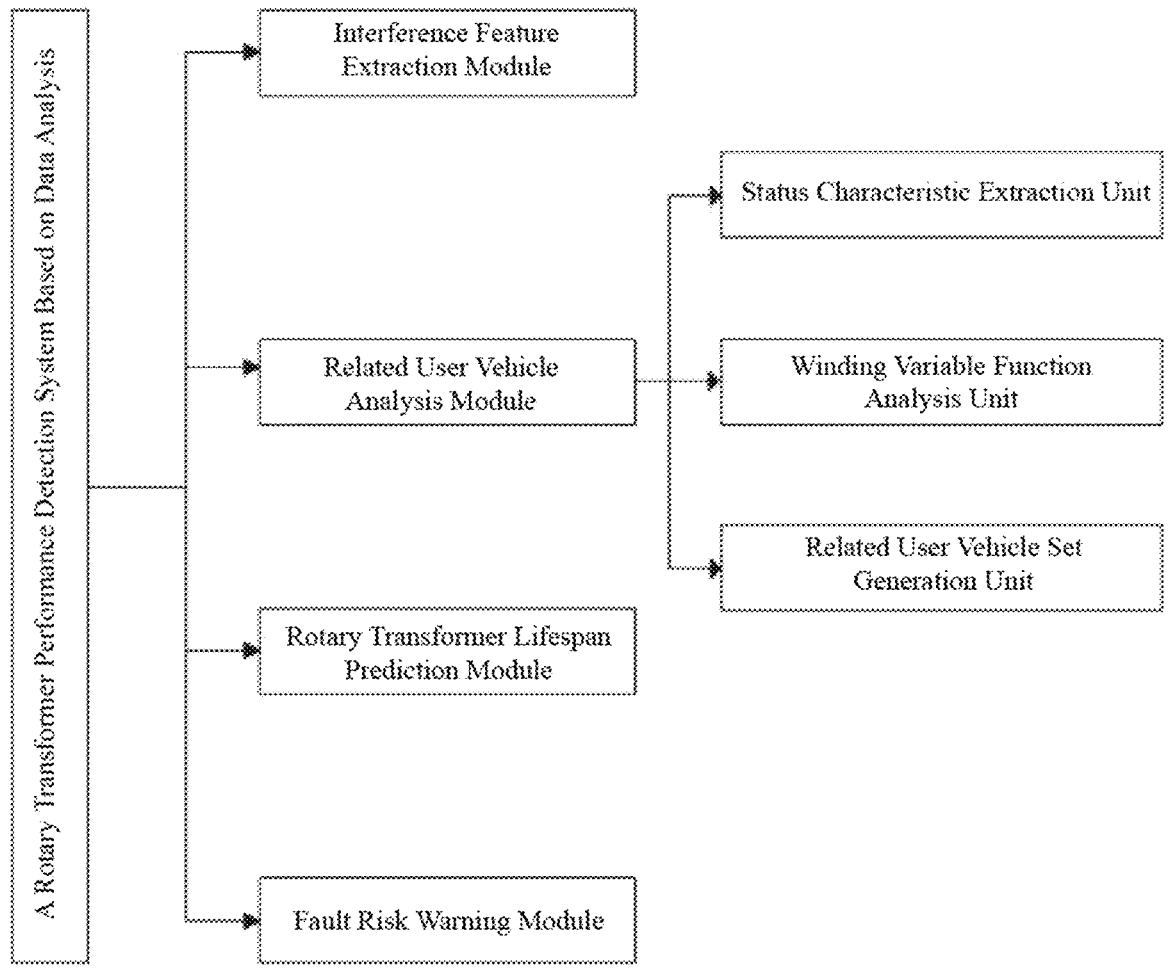
FIG. 2: A flowchart of the rotary transformer performance detection system based on data analysis according to the present invention.

As shown in FIG. 2, a system for detecting rotary transformer performance based on data analysis includes the following modules:

Interference Feature Extraction Module: This module obtains vehicle usage information during the period between two consecutive maintenance events for the vehicle under test from historical data. It generates interference characteristics of the rotary transformer based on this usage information, which includes the number of vehicle operations, the temperature values of the rotary transformer at different times during each operation, and the vibration state values.

Related User Vehicle Analysis Module**: This module obtains the status characteristics of the rotary transformer during each maintenance of the vehicle under test. It constructs the relationship function of winding variables with vehicle operation time, analyzes the deviation between the constructed relationship function and the corresponding functions in the database for vehicles that have undergone rotary transformer replacement, and obtains a set of related user vehicles.

Rotary Transformer Lifespan Prediction Module: This module combines the interference characteristics of the rotary transformer, based on the vehicle usage information, with the fluctuation range of resistance values corresponding to each winding of the rotary transformer, to obtain the bump open-circuit risk resistance variation for the vehicle under test. The bump open-circuit risk resistance variation of the vehicle under test is then substituted into the relationship function of winding variables with operation time for each related user vehicle in the set. The average value of the results for each operation time is recorded as the effective operational lifespan of the rotary transformer in the vehicle under test.

Fault Risk Warning Module: This module calculates the fault risk impact value of the rotary transformer at the current time based on its total usage time and effective operational lifespan from historical data. If the fault risk impact value is below the risk threshold, it generates a pre-warning message for rotary transformer replacement and sends this message to the user's mobile terminal via a wireless communication network, where the wireless communication network includes any of 4G, 5G, and WiFi.

The related user vehicle analysis module includes a status characteristic extraction unit, a winding variable function analysis unit, and a related user vehicle set generation unit.

The status characteristic extraction unit obtains the status characteristics of the rotary transformer during each maintenance, including the resistance values of the excitation winding, sine winding, and cosine winding.

The winding variable function analysis unit constructs the relationship function of winding variables with vehicle operation time, where the winding variables are defined as the maximum differences between the resistance values of the excitation winding, sine winding, and cosine winding, and their respective initial resistance values, with different resistance values for the excitation winding, sine winding, and cosine winding stored in the database.

The related user vehicle set generation unit analyzes the deviation between the constructed relationship function and the corresponding functions in the database for vehicles that have undergone rotary transformer replacement, thereby obtaining the related user vehicle set.

It should be noted that relational terms such as "first" and "second" are used solely to distinguish one entity or operation from another, without necessarily requiring or implying any actual relationship or order between such entities or operations. Furthermore, the terms "include," "comprise," or any other variations thereof are intended to cover a non-exclusive inclusion, so that a process, method, item, or apparatus that includes a list of elements not only includes those elements but may also include other elements not explicitly listed, or may include elements inherent to such process, method, item, or apparatus.

Finally, it should be understood that the above descriptions are merely preferred embodiments of the present invention and are not intended to limit the invention. Although the invention has been described in detail with reference to the foregoing embodiments, those skilled in the art may still make modifications to the technical solutions described in the foregoing embodiments or make equivalent substitutions for some technical features. Any modifications, equivalent replacements, or improvements made within the spirit and principles of the present invention should be included within the scope of the present invention.

The invention claimed is:

1. A method for detecting rotary transformer performance based on data analysis, comprising:
S1: obtaining vehicle usage information during the period between two consecutive maintenance events from historical data for a vehicle under test; generating interference characteristics of a rotary transformer in the vehicle under test based on the vehicle usage information wherein the vehicle usage information includes a number of vehicle operations, temperature values of the rotary transformer at different times during each operation, and vibration state values during each operation;
S2: obtaining a status characteristics of the rotary transformer during each maintenance event of the vehicle under test, wherein the status characteristics include resistance values of an excitation winding, a sine winding, and a cosine winding; constructing a relationship function that reflects changes in winding variables with the vehicle operation time, the winding variables being maximum differences between the resistance values of the excitation winding, the sine winding, and the cosine winding, and their respective initial resistance values; analyzing a deviation between the constructed relationship function and corresponding relationship functions in a database for vehicles that have undergone rotary transformer replacement, thereby obtaining a set of related user vehicles for the vehicle under test;
S3: combining interference characteristics of the rotary transformer based on the vehicle usage information and a fluctuation range of resistance values corresponding to each winding of the rotary transformer, to obtain a bump open-circuit risk resistance variation for the vehicle under test; substituting the bump open-circuit risk resistance variation into the relationship function of winding variables with operation time for each related user vehicle in the set obtained in S2, wherein an average value of results for each operation time is recorded as an effective operation life of the rotary transformer in the vehicle under test; and
S4: using a total usage time of the rotary transformer in the vehicle under test from historical data and the effective operation life of the rotary transformer, calculating a fault risk impact value of the rotary transformer at a current time, when the current fault risk impact value is less than a risk threshold, generating a pre-warning message for rotary transformer replacement, and sending this message to a mobile terminal of a user associated with the vehicle under test via a wireless communication network,
wherein:
in the vehicle usage information, the vibration state values of the rotary transformer at different times are equal to monitoring results of the vibration sensor closest to the rotary transformer at a corresponding time,
wherein:
generating interference characteristics of the rotary transformer based on the vehicle usage information in S1 comprises the steps of:
S11: obtaining the vehicle usage information during a period between the i-th and the (i+1)-th maintenance events from historical data for the vehicle under test, denoted as $A_{(i,i+1)}$; recording the time interval of the j-th operation of the vehicle in $A_{(i,i+1)}$ as $Bj_{(i,i+1)}$, and the temperature value of the rotary transformer at time t in $Bj_{(i,i+1)}$ as $Tt_{(i,i+1)}$, and the vibration state value at time t in $Bj_{(i,i+1)}$ as $Ztj_{(i,i+1)}$, where $t \in Bj_{(i,i+1)}$;
S12: obtaining the interference impact value of the operating environment on the rotary transformer during the j-th operation of the vehicle under test, during the period between the i-th and the (i+1)-th maintenance events, denoted as $Gj_{(i,i+1)}$, wherein $Gj_{(i,i+1)} = \int_{t=t1}^{t=t2} F\{Ttj_{(i,i+1)}, Tb\} = Ztj_{(i,i+1)} dt$, t1 represents the minimum value in $Bj_{(i,i+1)}$, t2 represents the maximum value in $Bj_{(i,i+1)}$, and Tb is a preset temperature reference value in the database, when $T_{(i,i+1)} \geq Tb$, $F\{Ttj_{(i,i+1)}, Tb\} = g \times (Ttj_{(i,i+1)} - Tb) + r$, when $Ttj_{(i,i+1)} < Tb$, $\{Tt_{(i,i+1)}, Tb\} = g1 \times (Tb - Ttj_{(i,i+1)}) + r$, wherein g represents the first interference conversion coefficient, g1 represents the second interference conversion coefficient, and r represents the temperature interference threshold, with g, g1 and r being preset constants in the database;

S13: entering each interference impact value of the operating environment on the rotary transformer for different i and j values from historical data into an empty set, to obtain an interference impact set, selecting an element with the maximum interference impact value in the interference impact set as the interference characteristic of the rotary transformer based on the vehicle usage information for the vehicle under test, wherein:

constructing the relationship function of winding variables with vehicle operation time in S2 comprises:

S201: obtaining the status characteristics of the rotary transformer during each maintenance event of the vehicle under test; and recording resistance values of the excitation winding, sine winding, and cosine winding during the i-th maintenance $D[i]_1$, $D[i]_2$, and $D[i]_3$, respectively;

S202: constructing a winding variable data pair corresponding to the status characteristics of the rotary transformer during the i-th maintenance event of the vehicle under test, denoted as (STi, RBi), STi represents the operation time of the vehicle from most recent rotary transformer replacement to the i-th maintenance event, and RBi represents the winding variable value corresponding to the status characteristics of the rotary transformer during the i-th maintenance event, $RBi = \max\{D[i]_1 - DM_1, D[i]_2 - DM_2, D[i]_2 - DM_2\}$, $\max\{\}$ denoting a function to obtain the maximum value, and $DM_1$, $DM_2$, and $DM_3$ represent initial resistance values of the excitation winding, the sine winding, and the cosine winding, respectively, corresponding to the most recent rotary transformer replacement; and S203: constructing a Cartesian coordinate system having an origin at o, the vehicle operation time as the x-axis, and winding variable values as the y-axis; plotting coordinates of the winding variable data pairs obtained in S202 for different values of i on the Cartesian plane; connecting adjacent coordinate points in ascending order of x-axis values to obtain a polyline chart representing the change in winding variable values with vehicle operation time, using the corresponding function of the polyline chart as the relationship function of winding variables with vehicle operation time, denoted as F(x), wherein a range of x is [0, xm], with xm representing a total operation time of the vehicle during a most recent maintenance event, wherein:

obtaining the set of related user vehicles for the vehicle under test in S2 comprises:

S211: obtaining the relationship function of winding variables with vehicle operation time for user vehicles in the database that have undergone rotary transformer replacement, wherein a relationship function for the k-th user vehicle before the replacement is denoted as Fk(xk), wherein a range of xk is [0,xkm], with xkm representing the total operation time of the k-th user vehicle at the time of replacement, wherein the operation time refers to a duration during which the vehicle was in a running state;

S212: calculating a deviation state value between F(x) and Fk(xk), denoted as $P_{[F(x),Fk(xk)]}$, wherein $P_{[F(x),Fk(xk)]} \{\int_{xL=0}^{xL=\min\{xm,xkm\}} Fk(xL) - F(xL) dxL\} / \min\{xm, xkm\}$, with min{ } representing the operation to obtain the minimum value, Fk(xL) denotes the result when xk equals xL in Fk(xk), and F(xL) denotes the result when x equals xL in F(x); and S213: when $P_{[F(x),Fk(xk)]} \leq \beta$ and xkm>xm, classifying the user vehicle corresponding to Fk(xk) as a related user vehicle for the vehicle under test, and β is a preset deviation state threshold in the database, the set of all related user vehicles for the vehicle under test in the database is referred to as the related user vehicle set for the vehicle under test, wherein:

obtaining the bump open-circuit risk resistance variation for the vehicle under test in S3 comprises: includes the following:

S301: obtaining the interference characteristics of the rotary transformer based on the vehicle usage information and the fluctuation range of resistance values corresponding to each winding, wherein the fluctuation range of resistance values for each winding of the rotary transformer corresponds to the normal operating resistance range for each winding, as preset in the database;

S302: obtaining the bump open-circuit risk resistance variation for the vehicle under test, denoted as min{a1, a2}, a1 represents the difference between the maximum resistance fluctuation value and the initial resistance value of the winding with the greatest difference from its initial resistance value at the current time, among the excitation winding resistance, the sine winding resistance, and the cosine winding resistance, a2 represents the open-circuit impact resistance, wherein $a2 = b - h \times c$, with b representing the difference between the maximum winding resistance n before the rotary transformer replacement in historical data and the initial resistance value of the corresponding winding of the rotary transformer in the vehicle under test, h represents the bump interference resistance coefficient, and c represents the interference characteristics of the rotary transformer based on the vehicle usage information, a value of h equals the average bump interference coefficient corresponding to each historical experimental data pair, with each experimental data pair corresponding to a bump interference coefficient, each experimental data pair is denoted as (Ec, N), wherein different experimental data pairs have different Ec values, Ec represents the interference characteristics of the rotary transformer based on the vehicle usage information in the experimental data pair, W represents the winding corresponding to a1 of the rotary transformer operation at the time of replacement before the replacement in the historical data, represents the average resistance value of the winding type W after being influenced by interference characteristics Ec in the experiment wherein the coil of the winding type W breaks under the influence of interference characteristics Ec, and N<n, and a bump interference coefficient corresponding to (Ec, N) is equal to (n−N)/Ec, and wherein:

obtaining the fault risk impact value of the rotary transformer at the current time in S4 comprises:

S41: obtaining the total usage time SYT and an effective operational lifespan YYT of the rotary transformer in the vehicle under test from historical data; and S42: calculating the fault risk impact value, denoted as GFY, where GFY=(YYT−SYT)/PYT, with PYT representing the average total operation time of the vehicle between consecutive maintenance events.

2. The method of claim 1, wherein the temperature values of the rotary transformer at different times in the vehicle usage information are obtained from the temperature sensor closest to the rotary transformer.

3. The method of claim 1, wherein, during the process of substituting the bump open-circuit risk resistance variation of the vehicle under test into the relationship function of winding variables with operation time for each related user vehicle in S3, keeping the y-axis coordinate range of each relationship function greater than or equal to the bump open-circuit risk resistance variation of the vehicle under test.

4. A rotary transformer performance detection system as described in claim 1, comprising an interference feature extraction module, a related user vehicle analysis module, a rotary transformer lifespan prediction module, and a fault risk warning module, wherein:

the interference feature extraction module is configured to obtain vehicle usage information during the period between two consecutive maintenance events for the vehicle under test from historical data, and generating the interference characteristics of the rotary transformer based on this usage information, wherein the vehicle usage information includes the number of vehicle operations, the temperature values of the rotary transformer at different times during each operation, and the vibration state values;

the related user vehicle analysis module is configured to obtain the status characteristics of the rotary transformer during each maintenance event of the vehicle under test and to construct the relationship function of winding variables with vehicle operation time and analyze the deviation between the constructed relationship function and the corresponding functions in the database for vehicles that have undergone rotary transformer replacement, thereby obtaining a set of related user vehicles for the vehicle under test;

the rotary transformer lifespan prediction module is configured to combine the interference characteristics of the rotary transformer based on the vehicle usage information and the fluctuation range of resistance values corresponding to each winding, to obtain the bump open-circuit risk resistance variation for the vehicle under test, and to substitute this variation into the relationship function of winding variables with operation time for each related user vehicle and record the average value of the results for each operation time as the effective operational lifespan of the rotary transformer in the vehicle under test, and the fault risk warning module is configured to calculate the fault risk impact value of the rotary transformer at the current time based on the total usage time and effective operational lifespan from historical data, and when the fault risk impact value is below the risk threshold, to generate a pre-warning message for rotary transformer replacement and send this message to the user's mobile terminal via a wireless communication network, wherein the wireless communication network is selected from 4G, 5G, and WiFi.

5. The rotary transformer performance detection system as described in claim 4, wherein the related user vehicle analysis module comprises a status characteristic extraction unit, a winding variable function analysis unit, and a related user vehicle set generation unit, wherein:

the status characteristic extraction unit is configured to the status characteristics of the rotary transformer during each maintenance event of the vehicle under test, which includes the resistance values of the excitation winding, the sine winding, and the cosine winding;

the winding variable function analysis unit is configured to construct the relationship function of winding variables with vehicle operation time, and the related user vehicle set generation unit is configured to analyze the deviation between the relationship function obtained by the winding variable function analysis unit and the corresponding functions in the database for vehicles that have undergone rotary transformer replacement, thereby obtaining the related user vehicle set for the vehicle under test.

* * * * *